United States Patent [19]

Onda

[11] Patent Number: 4,558,358

[45] Date of Patent: Dec. 10, 1985

[54] CABLE NETWORK MONITORING SYSTEM FOR CATV SYSTEM

[75] Inventor: Kazuyoshi Onda, Tokyo, Japan

[73] Assignee: Pioneer Electronic Corporation, Tokyo, Japan

[21] Appl. No.: 382,835

[22] Filed: May 27, 1982

[30] Foreign Application Priority Data

May 27, 1981 [JP] Japan .................................. 56-81622

[51] Int. Cl.⁴ .............................................. H04N 7/18
[52] U.S. Cl. ..................................... 358/86; 358/139; 455/5; 455/9
[58] Field of Search ..................... 358/86, 139; 375/10; 455/5, 9, 68, 69

[56] References Cited

U.S. PATENT DOCUMENTS 4,365,249 12/1982 Tabata ...................................... 455/2
4,408,345 10/1983 Yashiro et al. ......................... 358/86

*Primary Examiner*—Edward L. Coles, Sr.
*Attorney, Agent, or Firm*—Sughrue, Mion, Zinn, Macpeak & Seas

[57] ABSTRACT

A CATV system includes terminal units with which two-way data communication with a central terminal is possible. A cable network monitoring system is capable of assisting in the location of faults by sending data such as the received signal strength at various points of the network back to the central station for analysis.

4 Claims, 3 Drawing Figures

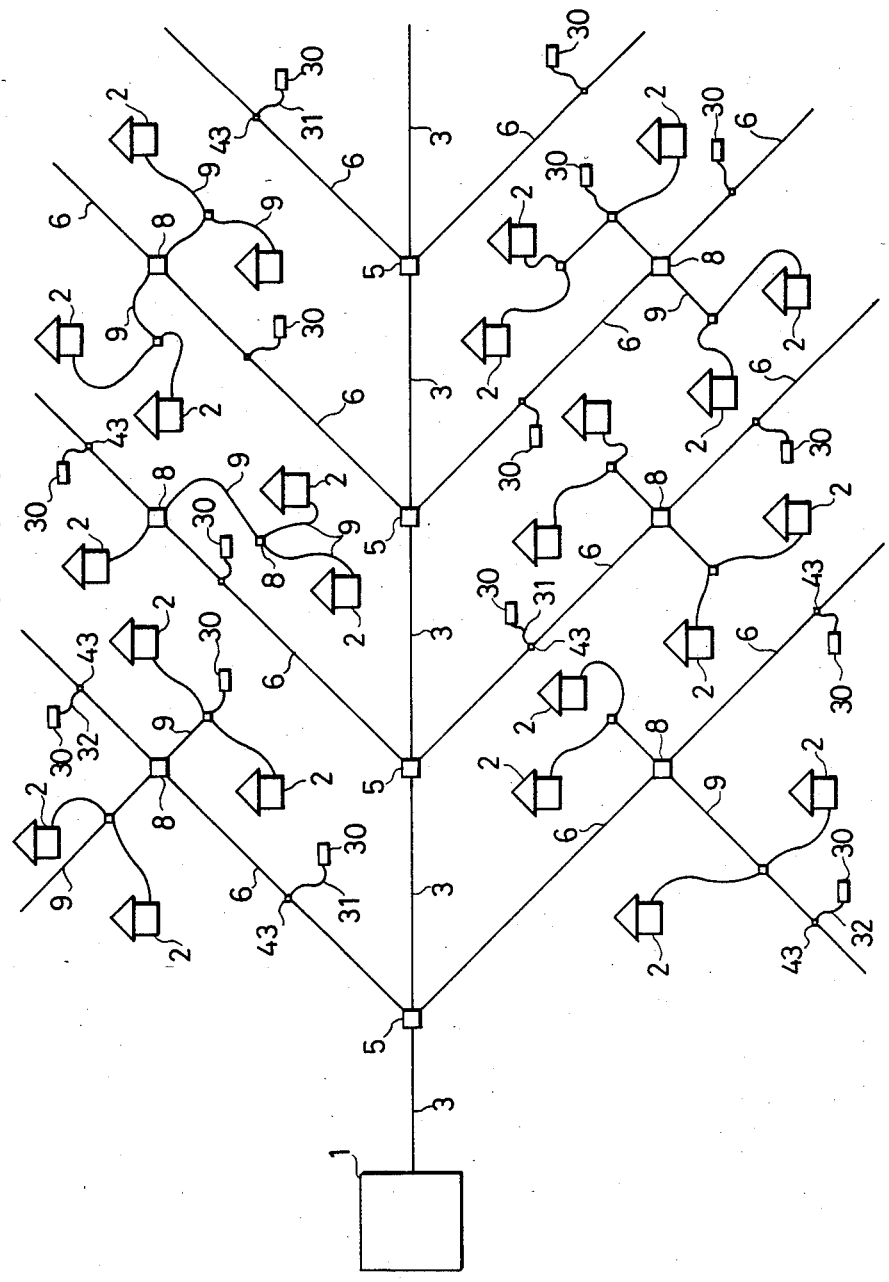

CABLE NETWORK MONITORING SYSTEM FOR CATV SYSTEM

BACKGROUND OF THE INVENTION

The present invention relates to a CATV system, and more particularly to a cable network monitoring system for a CATV system in which a cable network can be totally and completely monitored at a center or base station.

Recent developments in electronic equipment have made it possible to carry out the transmission of multi-channel broadcasting through a cable while also carrying out bi-directional data communication between the center and a plurality of terminal units. A CATV system has in fact been practically used wherein TV programs or FM broadcasting are transmitted from the center to the individual terminal units through cables connecting them to the center, and wherein data are transmitted from the individual terminal units to the center.

An outline of the CATV system will be described with reference to FIG. 1. The CATV system includes a single center 1 and terminal units 28 which are provided, for example, in several tens of thousands of subscriber's homes. The center 1 is connected through coaxial cables to the terminal units 28. A main cable 3 extends from the center 1 and main cable amplifiers 4 and branching units 5 are provided at predetermined positions on the main cable 3. A plurality of branch cables 6 extend from each branching unit 5. Extension amplifiers 7 and tap-off units 8 are provided at predetermined points on the branch cable 6. Each tap-off unit 8 is connected to branch lines 9 which extend to the terminal units 28 in individual homes 2. Each terminal unit 28 includes a main unit 10, a television set 1 and a control unit 12. The branch line 9 is connected to the main unit 10 which is in turn connected to the television set 11 and to the control unit 12. As is apparent from the above description, the main cable extending from the center is branched into a first plurality of branch cables which are further branched into a second plurality of branch lines which are finally connected to the terminal units 28.

A signal receiving antenna 13 is installed outside the center 1. The antenna 13 is connected to a demodulator 15 in a source group 14 of the center 1. The source group 14 further includes a video disc player 16, a video tape recorder 17 and a studio 18. The output signals of the source group 14 are applied to a modulation output section 19 composed of two systems. One of the two systems includes an IF modulator circuit 20, a scramble circuit 21, and an upconverter circuit 22 while the other system includes an IF modulator circuit 23 and an upconverter circuit 24. The outputs of the up-converters 22 and 24 are connected to the main cable 3 to which a data transceiver 25 is connected for data communication between the center 1 and each main unit 10. The data tranceiver 25 is connected to a computer 26 which is connected to a peripheral unit 27 such as a printer or a display unit.

The operation of the CATV system thus constructed now will be described.

First, the power switch of the television set 11 is turned on. With the television set 11 set to a particular unused channel, the control unit 12 is operated so that the frequency of a desired channel to be received is set to that of the unused channel. The channels which can be selected by the control unit 12 as described above can be classified into three groups of channels for (A) retransmission programs in which television signals from local stations are received without modification, (B) independent programs (free of charge,) and (C) chargeable (pay programs. Each group is allocated ten channels, and therefore any of the thirty channels can be selected by operating the control unit 12.

(A) Retransmission programs

Television signals received by the antenna 13 are demodulated by the demodulator 15 and applied to the modulation output section 19. The signal thus applied is modulted by the IF modulator circuit 23. The frequency of the signal thus modulated is increased to a predetermined frequency by the up-converter circuit 24 according to determined frequency allocation scheme. That is, it is assigned to a predetermined channel. The resultant signal is applied through the main cable 3, the branch cables 6, and the branch lines 9 to the television sets 11.

(B) Independent programs

The independent programs include locally originating programs such as weather forecast programs, news programs, and the like. In the case of programs recorded on discs of the video disc player 16 or on the video tape recorder 17 or in the case of live programs produced in the studio 18, the video signal is modulated by the IF modulator circuit 23 and the frequency of the signal thus modulated is increased to that of a predetermined channel by the up-converter circuit 24. The resultant signal is applied to the main cable 3. Reception of these programs is free of charge. That is, the proce of these programs is included in the basic monthly charge paid by the subscriber.

(C) Chargeable programs

The chargeable programs include new movie programs, special programs, and the like. In the case of programs provided by the video disc player 16 or the video tape recorder 17 or in the case of live programs produced in the studio 18, the video signal is modulated by the IF modulator circuit and is then processed by the scrambler circuit 21 so that the signal cannot be reproduced without special signal processing. Then, the frequency of the signal is increased to that of a predetermined designated channel, and is applied to the main cable 3. In order to receive the chargeable programs, the video signal must be descrambled by the main unit 10 in the subscriber's home 2 so that a regular image appears on the television set 11. The subscriber is charged for the reception of the chargeable programs. That is, predetermined charges therefor are summed, and the user is requested to pay a special charge at a measured rate in addition to the basic monthly charge.

As described above, the center 1 is connected through coaxial cables to the terminal units in the subscriber's homes 2. However, in order to charge the subscribers for the reception of the chargeble programs, it is absolutely necessary to detect which subscribers receive which channels. That is, it is necessary to detect the channels which have been selected by the subscribers at various times. In order to meet this requirement, the data transceiver 25 outputs a retrieving signal at predetermined time intervals so that the terminal units 28 are called via their assigned address numbers. That is, the channels received by the terminal units at the time of transmission of the retrieving signal are detected, this operation being referred to as "polling". In response to this polling, each terminal unit 28 "answers" the data transceiver 25 with data representative of the channel received by the terminal unit at the time of polling. Various reception and transmission data for the data transceiver 25 are arranged and stored by the computer 26 and are displayed or printed out by the peripheral unit 27. The polling operation is carried out at predetermined time intervals of several seconds to several tens of seconds and therefore audience ratings can be readily calculated.

Sometimes, the subscribers may participate in the production of programs. In this case, by operating the control units 12, they can answer questions proposed in a program or the like while watching the television sets 11. The answers are transmitted through the coaxial cables to the center 1.

As described above, the CATV system is convenient in that it can carry out bi-directional data communication between the center 1 and the individual terminal units 28. However, in order to implement normal data communication therebetween, it is essential that the cable network formed of the cables 3, 6 and 9 be in order at all times. If a cable 3, 5 or 9 becomes disconnected at a certain location or if attenuation becomes significant, the terminal units 28 distributed downstream of the trouble spot cannot receive the programs and the center 1 cannot receive a response to an interrogation sent to these terminals. When the response to an interrogation from the center 1 is not received at the center from the terminal unit 28, or the level of the responsive up-stream data signal is low, it is difficult to immediately determine the cause of the trouble, i.e., whether it has occured in the cables or in the terminal unit per se. Heretofore, in order to cure or prevent such a problem, it has been necessary to either check the level of the up-stream data signal at the terminal unit 28 or periodically check certain portions of the cable network. Thus, the conventional CATV system is disadvantageous in that the overall cable network canot be centrally monitored at the center.

SUMMARY OF THE INVENTION

In view of the above mentioned difficulties, an object of the present invention is to provide a cable network monitoring system for a CATV system. In accordance with the invention, a plurality of monitor terminals, each having a bi-directional data communication capability, are arranged at predetermined positions in the cable network so that the status of the respective cable positions can be reported to the center terminal at all times, to thereby enable complete trouble-shooting of the cable network from the center.

DETAILED DESCRIPTION OF THE PREFERRED EMBODIMENT

A preferred embodiment of the present invention will now be described with reference to the attached drawings.

Figure 1:
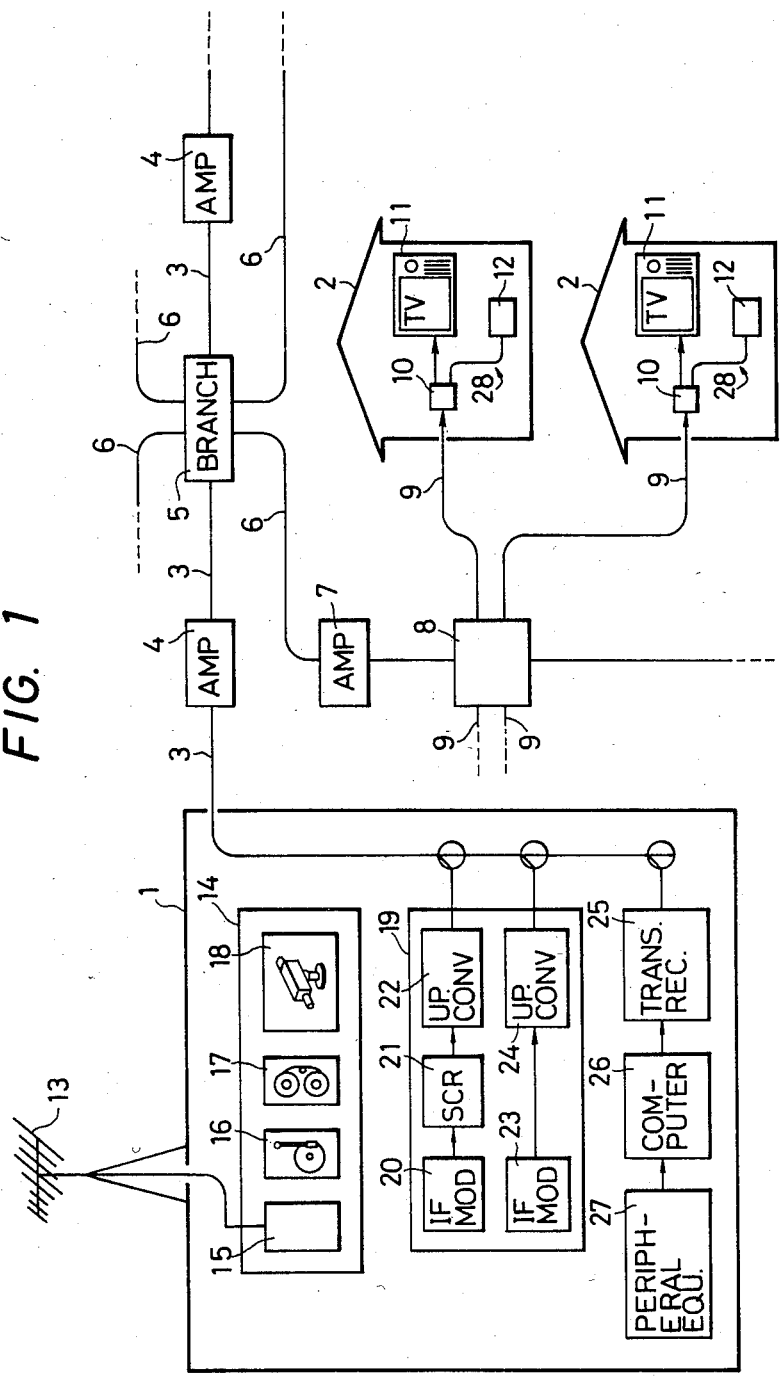
FIG. 1 is an explanatory diagram illustrating a CATV system.
Figure 2:
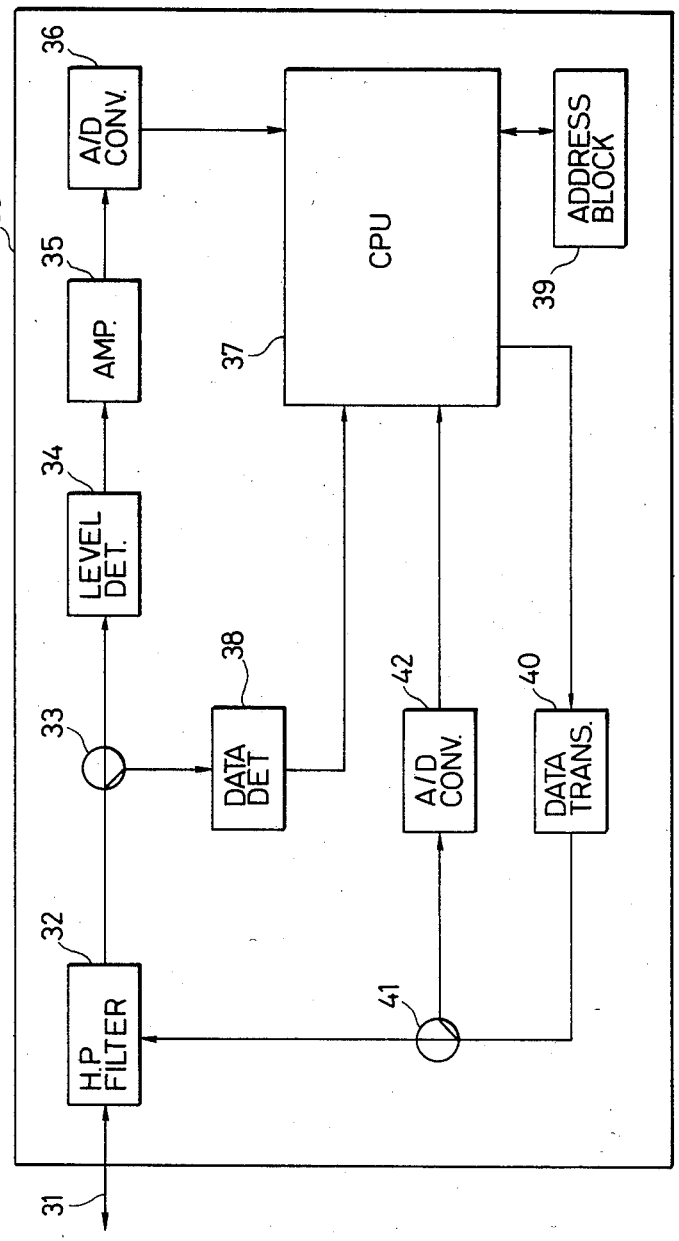
FIG. 2 is a block diagram showing the construction of a monitor terminal according to the invention; and,
FIG. 3 is an explanatory diagram illustrating the positions of monitor terminals as distributed in a network.

FIG. 2 shows the construction of a monitor terminal 30 of the invention, which includes a high-pass filter 32 having an input connected to one end of a cable 31. An output of the filter 32 is connected through a branching unit 33 to an input of a level detector 34 whose output is connected to an input of an amplifier 35. The amplifier 35 has an output connected to a input of an A/D converter 36, whose output is connected to one of three inputs of a central processing unit (CPU) 37.

A data detector 38 is connected between the branching unit 33 and a second input of the CPU 37, and an address block 39 containing a specific code is connected to the CPU 37.

An output of the CPU 37 is connected to an input of a data transmitter 40 whose output is connected through a second branching unit 41 to the filter 32. A second A/D converter 42 is connected between the branching unit 41 and a third input of the CPU 37.

FIG. 3 illustrates a cable network for the CATV system, in which a plurality of the monitor terminals 30 are arranged. In this arrangement of monitor terminals, branching units 43 are disposed at predetermined points of a main cable 3 and branch cables 6 and 9, to which one end of cables 31 whose other ends are connected to the respective monitor terminals 30 are connected, respectively. That is, according to the present invention, the monitor terminals 30 are added to the conventional cable network of the CATV system, to which terminal units 28 disposed in individual houses are connected.

Each of the monitor terminals 30 has its own address code, which codes are different from one another as well as from those assigned to the terminal units 28, so that it is possible to selectively carry out bi-directional data communication between the center terminal 1 and any one of the monitor terminals 30 and/or between the center terminal 1 and any one of the terminal units 28.

In operation, polling is effectuated by a downstream data signal transmitted by the center terminal 1 through the network to monitor the individual monitor terminals 30 and the terminal units 28 at all times. That is, the polling signal includes an address signal for interrogating a specific monitor terminal 30 or a specific terminal unit 28 and various command data to which a response is required. When the polling signal is supplied through the cable to the monitor terminal 30, the signal is firstly received by the filter 32 of the monitor terminal 30 in which a high frequency component (e.g. 121.35 MHz) is passed therethrough and is supplied through the branching unit 33 to the level detector 34 and to the data detector 38.

The down-stream data signal is subjected to frequency shift keying (FSK). In each monitor terminal 30, an input level of the high frequency component of the polling signal is detected by the level detector 34, which provides the detected level at an output thereof as an analog signal. The analog signal at the output of the level detector 34 is amplified by the amplifier 35 and is supplied to the A/D converter 36 in which the analog signal is converted into a digital code. The digital code from the A/D converter 36 is supplied to the CPU 37.

At the same time, the high frequency component of the polling signal is demodulated by the data detector 38 to obtain the command content thereof and the command content thus obtained is supplied to the CPU 37.

In the CPU 37, an address code included in the polling signal is compared with the address code in the address block 39 of the monitor terminal 30, which address code is specific to that monitor terminal 30.

When the comparison indicates a coincidence between the address code contained in the polling signal and the address code contained in the address block 39, the CPU 37 analyzes the command content included in the polling signal from the data detector 38, and provides the input level of the signal applied from the A/D converter 36 to the data transmitter 40 as responsive content to be sent to the center 1, while adding the address code of that monitor terminal 30.

In the data transmitter 40, the data supplied by the CPU 37 including the response to the command content, the level of the received polling signal, and the address of the monitor terminal 30 is subjected to phase shift keying (PSK) to provide a first part of an up-stream data signal at 24 MHz, and the first portion is sent through the branching unit 41 to the filter 32 and is then transmitted through the cable 31 to the center 1.

The first part of the up-stream data signal from the data transmitter 40 is also supplied to the A/D converter 42. In the A/D converter 42, the level of the up-stream data signal is converted into a digital code which is supplied to the CPU 37, from which the digital code is supplied to the data transmitter 40. In the data transmitter 40 the digital code is modulated and sent through the filter 32 and the cable 31 to the center 1 as a second part of the up-stream data signal. Thus, the up-stream data signal comprising the first and second parts sent from the monitor terminal 30 includes the address code assigned to that monitor terminal, the level of the polling signal as received thereby, and the responsive content to the command contained in the polling signal which includes the level of the up-stream data signal as being transmitted by the monitor terminal.

The up-stream data signal from the interrogated monitor terminal 30 is received by the center terminal 1 and is analyzed in the computer 26 included therein. The analysis to be performed by the computer 26 includes a comparison of the transmitted level of the polling signal at the center terminal 1 with the received level of the polling signal at the interrogated monitor terminal and a comparison of the transmitted level of the up-stream data signal at the monitor terminal with the received level of the up-stream data signal at the center terminal 1, as well as the usual analysis of the responsive content.

With these comparisons performed in the center 1, it is possible to determine various conditions of the monitor terminals. For example, when there is no up-stream data signal received at the center from interrogated monitor terminals, it is likely that a portion of the network has been broken, the location of the break being on the up-stream side of the interrogated monitor terminals closest to the center 1.

When up-stream data signals are received at the center and there are differences in level between the down-stream data signals transmitted at the center 1 and received at the monitor terminal and/or between the up-stream data signals transmitted at the monitor terminals and received at the center terminal which are beyond predetermined values, it is evident that there is a considerable alteration of signals occurring in a portion of the network between the center and the closest such interrogated monitor terminal.

Thus, the maintenance of the network is facilitated because the location within the network where attention or separation is required is easily determined. That is, by analysing the down-stream data signal and the up-stream data signal at the center 1, it is possible to determine whether or not data communication between respective portions of the cable network is properly performed. When there if any unusual disruption of normal communication, the location of the source thereof can be identified at the center as being between a monitor terminal whose response is monitored as usual and other monitor terminals which are down-stream of the latter monitor terminal and whose responses are unusual, and in particular between the normally operating terminal and the closest unusually responding monitor terminals to the center terminal. Therefore, problems in the cable network can be isolated to such location directly without checking the whole network.

With the present invention as thus constructed, the operational status of the cable network of the CATV system can be completely monitored at all times at the center terminal. Therefore, the maintenance of the network is facilitated without requiring the periodic patrol of maintenance persons along the network, making direct and exact checks of the network possible.

What is claimed is:

1. A cable network monitoring system for a bi-directionally communicating CATV system, comprising; a center, a plurality of terminal units connected to said center through cables, and a plurality of monitor terminals disposed at certain locations in a cable network of said CATV system, each of said plurality of monitor terminals comprising: (a) means for receiving a polling signal specific thereto and including an address code and a downstream data signal sent from said center, (b) means for detecting a signal level of said polling signal transmitted from said center, and (c) means for transmitting an upstream signal responsive to said downstream data signal portion of said polling signal, said upstream signal including a signal indicative of the detected signal level of said same polling signal, whereby the cable network may be monitored at said center from said upstream signal.

2. A device as claimed in claim 1, said upstream signal containing at least said address code.

3. A device as claimed in claim 1, said monitors further comprising means for detecting a level of a signal transmitted by said monitor.

4. A device as claimed in claim 3, a signal indicative of the level of a signal transmitted by said monitor being transmitted by said monitor as a further part of said upstream signal.

* * * * *